United States Patent [19]
Walker et al.

[11] Patent Number: 5,280,964
[45] Date of Patent: Jan. 25, 1994

[54] JUNCTION ADAPTER WITH AXIAL EXTENSION PORTIONS

[75] Inventors: William Rocky Walker, Leonard; William R. Walker, Rochester, both of Mich.

[73] Assignee: Hydro-Craft, Inc., Mich.

[21] Appl. No.: 943,313

[22] Filed: Sep. 10, 1992

[51] Int. Cl.$^5$ .............................................. F16L 35/00
[52] U.S. Cl. ................................... 285/39; 285/137.1; 285/349; 285/353; 248/68.1
[58] Field of Search ................ 285/137.1, 39, 61, 349, 285/353; 246/68.1

[56] References Cited

U.S. PATENT DOCUMENTS

| | | | |
|---|---|---|---|
| 2,307,690 | 1/1943 | Lee ................................ | 285/137.1 X |
| 2,359,846 | 10/1944 | Hayman . | |
| 3,254,399 | 6/1966 | Zahuranec . | |
| 3,337,181 | 8/1967 | Wennerstrom ............... | 285/137.1 X |
| 3,397,431 | 8/1968 | Walker . | |
| 3,414,220 | 12/1968 | Walker . | |
| 3,512,806 | 5/1970 | Romney et al. ................... | 285/137.1 |
| 3,930,674 | 1/1976 | Jonsson ......................... | 285/137.1 X |
| 4,878,696 | 11/1989 | Walker . | |
| 5,098,047 | 3/1992 | Plumley . | |

FOREIGN PATENT DOCUMENTS 1224164 6/1960 France ................................ 285/137.1

OTHER PUBLICATIONS

Parker Fluid Connectors Catalog No. 4350, Dec. 1984.

*Primary Examiner*—Dave W. Arola
*Attorney, Agent, or Firm*—Harness, Dickey & Pierce

[57] ABSTRACT

A junction adapter, having face seal fluid fittings and being for use in a conventional plural line clamping system, has axial extension portions which extend from a central support portion, in a manner which permits face seal fluid connectors to be easily accessed by a wrench or like tool. Two embodiments of this new kind of junction adapter are described. The first embodiment features a junction adapter having axial extension portions which extend symmetrically outwardly from a central support portion substantially beyond the axial extension portions of conventional face seal junction adapters. This first embodiment can be installed in a plural line clamping system in an alternating manner with conventional face seal junction adapters. This enables those in the art to obtain the benefits of the present invention without obsoleting existing face seal junction adapters for plural line clamping systems The second embodiment is an asymmetrical junction adapter having axial extension portions extending for substantially different lengths from the central support portion. This embodiment can be installed in new plural line clamping system in an alternating manner so the fluid connector portions of each are staggered, that is extend a different length at each position in the clamping system.

12 Claims, 2 Drawing Sheets

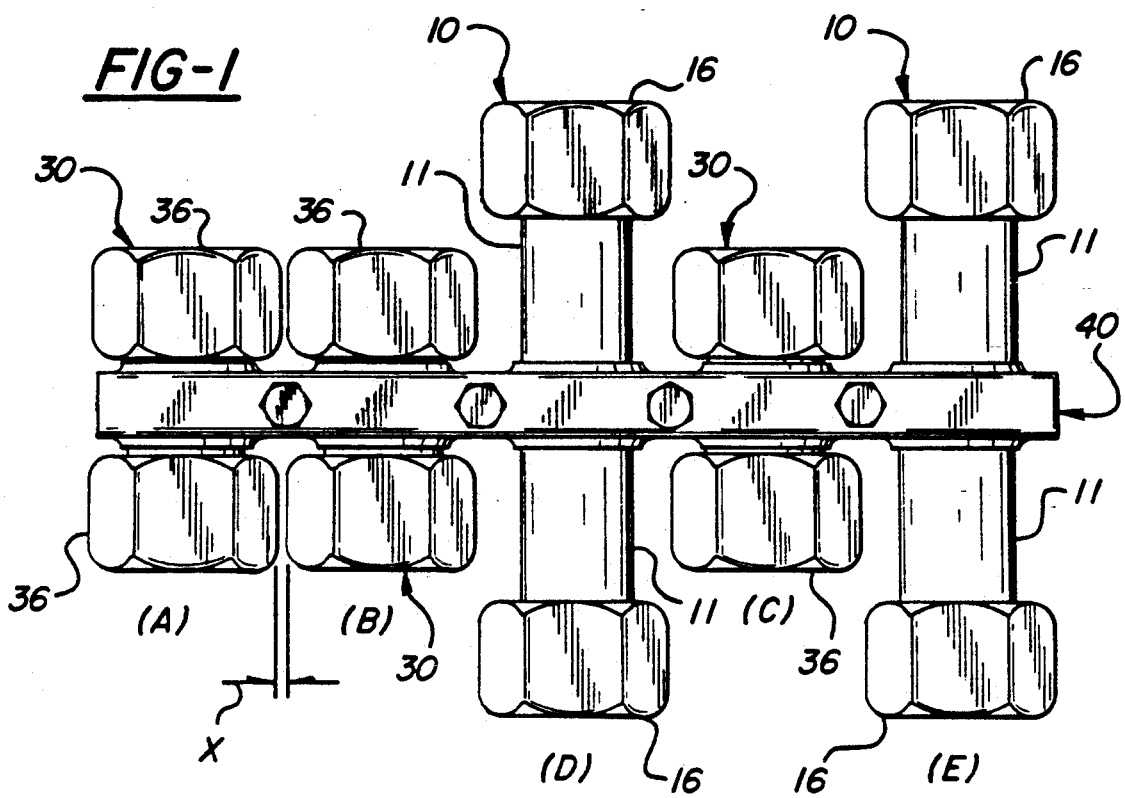
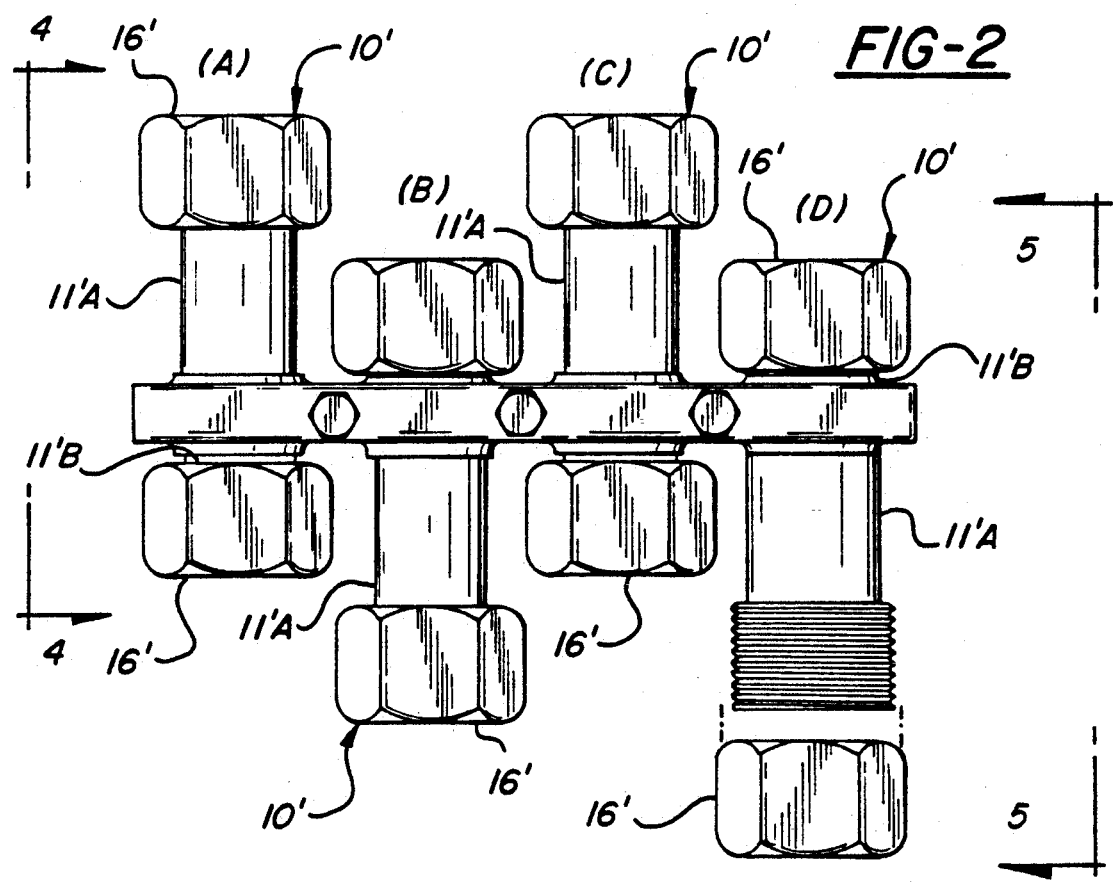

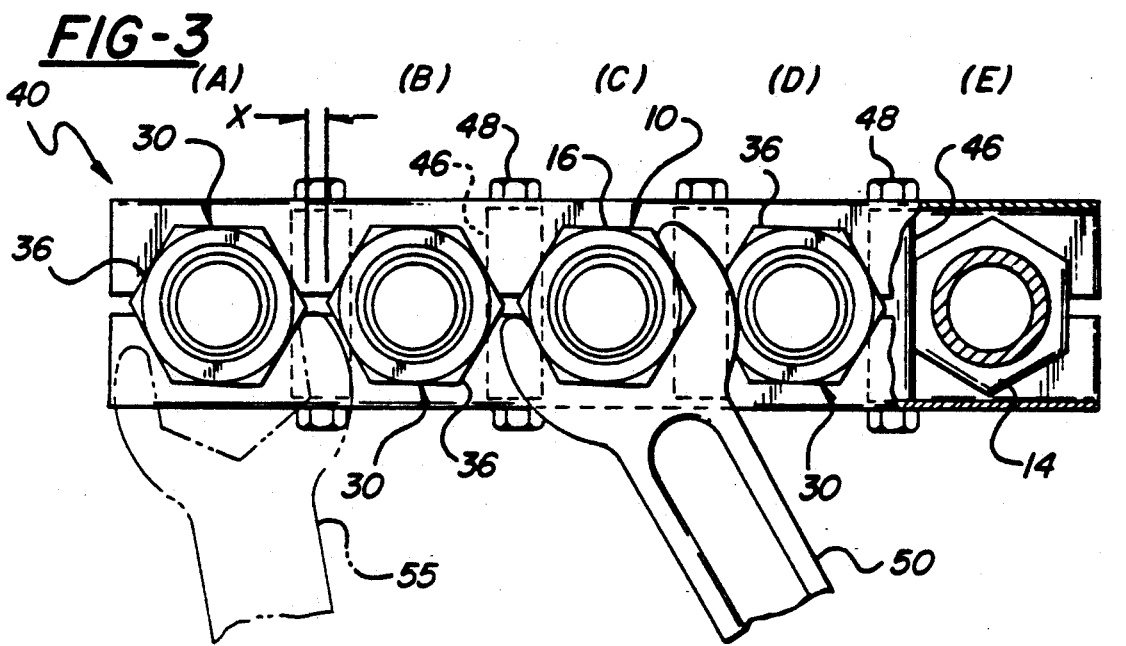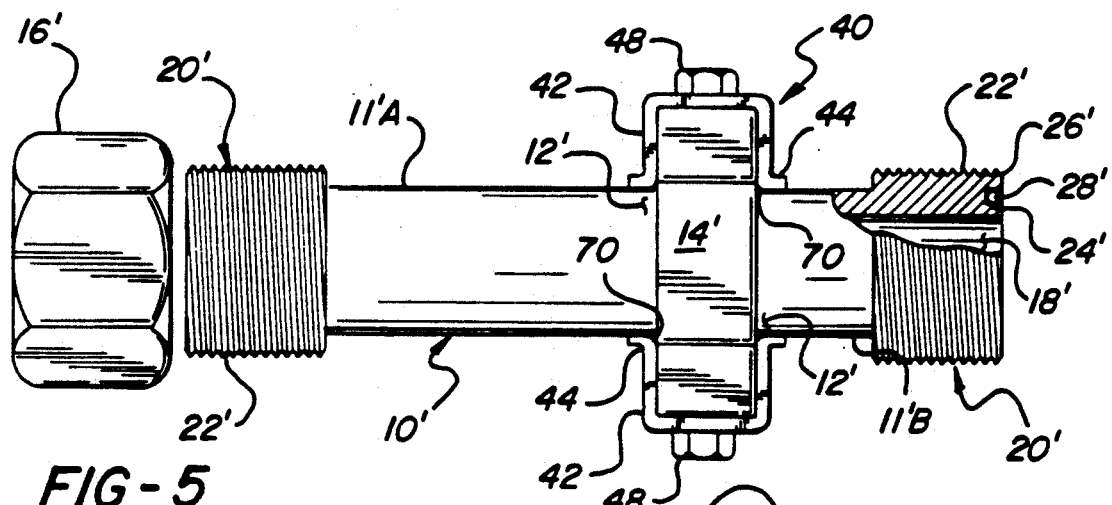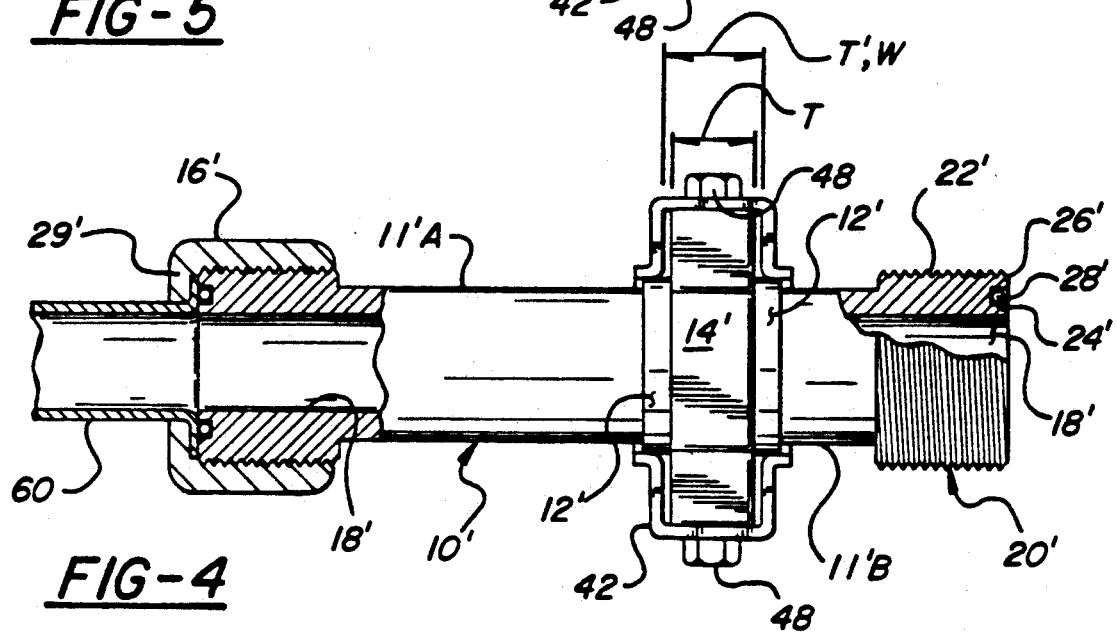

JUNCTION ADAPTER WITH AXIAL EXTENSION PORTIONS

BACKGROUND OF THE INVENTION

1. Technical Field

The present invention relates generally to junction adapters for use in a conventional plural line clamping system and, more particularly, to junction adapters which have axial extension portions which project axially outwardly from a central support portion so that the locking nuts for the fluid connections to the junction adapters, especially those having face seal connections, are made more easily accessible by a standard wrench or like tool.

2. Discussion

Plural line clamping systems are widely used in hydraulics applications whenever it is necessary to connect a plurality of fluid lines to a machine. The plural line clamping system is a mounting device for holding the connectors that connect the fluid lines from the machine to the fluid lines heading to the source of fluid power. These connectors are commonly known as junction adapters. The plural line clamping system provides a secure mount for the junction adapters so that they will not shake loose or rattle. Plural line clamping systems and a variety of junction adapters used with them are disclosed in U.S. Pat. Nos. 3,397,431, 3,414,220 and 4,878,696, as well as in copending U.S. patent application Ser. No. 07/733,344, all in the name of William Ray Walker, an inventor of the present invention, and assigned to Hydro-Craft, Inc., of Rochester Hills, Mich., the assignee of present invention. These patents and application are hereby incorporated by reference.

Since their introduction, plural line clamping systems such as those available from Hydro-Craft, Inc. and sold under the trademark MULTI-CLAMP®, have become quite popular and are widely used in the machine tool industry to route and secure hydraulic and pneumatic piping, tubing and other lines in an orderly, neat and efficient manner. The MULTI-CLAMP® system is widely used in nearly every hydraulics application to secure a plurality of fluid lines. There are currently several tens of thousands of MULTI-CLAMP® systems in use in the United States and other countries, and MULTI-CLAMP® systems in several standard sizes have been marketed for years by the assignee of the present invention.

In general, each of these plural line clamping systems includes two U-shaped, stamped metal channels which oppose one another. The channels are formed with semi-cylindrical collars that support the junction adapters at cylindrical collar support portions formed on the junction adapter. As can be seen from the prior patents, the plural line clamping system can typically have four to ten or more opposing pairs of semi-cylindrical collars, each pair capable of supporting a junction adapter.

The most commonly used MULTI-CLAMP® systems are labeled with the HC-10, HC-16 and HC-32 Series designations, which support junction adapters for fluid lines on 1.5 inch, 2.0 inch and 3.0 inch centers, respectively. In addition, there are larger MULTI-CLAMP® series including the HC-46, HC-72 and HC-96 Series designations, which have progressively greater distances between the centers of the fluid lines.

The junction adapters used in conjunction with the MULTI-CLAMP® systems have undergone great development and improvement in design and manufacturability over the years. For example, early on junction adapters were designed having a multi-piece construction. The junction adapters were formed having a rectangular central support portion, or body, and a separate cylindrical portion.

These rectangular junction adapters were somewhat difficult to manufacture. Several different methods were employed over the years to make them. In the original process, the first step in the manufacturing process was to machine a rectangular block of steel into the height, width and thickness required for the central support portion so that it would be received within the channels of a plural line clamping system. The next step was to drill a hole through the rectangular portion to accommodate the cylindrical portion. Cylindrical bar stock was then machined to form the cylindrical portion. Finally, the cylindrical portion was placed or pressed in the hole in the rectangular portion and brazed to hold it in place.

A second process employed to manufacture the rectangular junction adapter involved using a powdered metal casting for the rectangular portion. Such a casting was formed to the appropriate dimensions with the center hole being pre-formed as part of the casting process. This technique eliminated the need for machining the rectangular portion. However, because the powdered metal did not braze well, a conventional epoxy capable of withstanding temperatures in excess of 200° F. was applied to the joint to secure the machined cylindrical portion to the rectangular portion.

A third process for making the rectangular junction adapters involved using a roll pin, in place of the brazing operation or the epoxy glue operation, to lock the cylindrical portion in place with respect to the rectangular portion. The roll pin was yet another technique for positively securing the cylindrical portion in place with respect to the rectangular portion. However, the production costs associated with the use of a roll pin were quite high due to the extra machining and assembly steps required.

A fourth process for making the rectangular junction adapters utilized a one-piece construction technique which eliminated the effort of assembling the rectangular portion and the cylindrical portion from separate pieces. In this fourth process, a cold forged blank was made in the general configuration of, but which had overall dimensions slightly larger than, the desired finished adapter. The rectangular portion of the blank was then machined to size, and thereafter the cylindrical portion was machined. But, they could not be readily machined on the most economical type of machinery, namely, automatic screw machines. Also, it was considerably more difficult and expensive to machine a forged part than to machine a non-forged part made of mild steel or powdered metal, which increased manufacturing costs.

The next generation junction adapter evolved into a one-piece unit having a hexagonal central support portion that eliminated many of the manufacturing problems and expense associated with the earlier rectangular junction adapters. In this newer configuration, the junction adapter was formed from a single piece of hexagonal bar stock. A significant advantage of this hexagonal junction adapter was that standard sizes of hexagonal bar stock of mild 1008 or 1010 steel already met the necessary dimensions for the central support portion of a junction adapter to fit into a MULTI-CLAMP® system, thus much of the machining required with the rectangular design was eliminated. Also, the hexagonal bar stock could be easily machined to final configuration by automatic screw machines. Further, because the hexagonal junction adapter was designed to be one-piece, all of the problems of the rectangular junction adapters related to the complex manufacture and assembly of two pieces to form a junction adapter were eliminated.

In recent years, the design of the junction adapter has evolved even further. In particular, the use of junction adapters having face seal fluid connectors, in lieu of the common flare fluid connectors, have become increasingly popular. The face seal fluid connector has become desirable because it exhibits several advantages over the flared fluid connector. For example, face seal fluid connectors can connect to fluid lines operating under as much as 6,000 psi without leaking. Also, these connectors can be repeatedly connected and disconnected to the fluid line without causing any significant detriment to the connector's seal. Further, face seal fluid connectors, unlike some flared fluid connectors, have standard internal diameters that match the fluid lines to which they connect, thereby eliminating any adverse effects on the fluid flow through the junction adapter.

However, junction adapters with face seal fluid connectors used in the MULTI-CLAMP ® systems have presented a new problem. When the junction adapters are located in adjacent positions of the clamping system, the clearance between the adjacent locking nuts that secure the fluid lines to the junction adapters does not permit a wrench or other tool to easily access the flats of the locking nut. This condition is illustrated in FIGS. 1 and 3 of the drawings. As shown in positions A and B of FIGS. 1 and 3, the locking nuts 36 of conventional face seal junction adapters 30 cannot be accessed by a wrench 55 or other tool when they are positioned in adjacent locations A, B in the plural line clamping system 40. As illustrated, clearance X between each junction adapter 30 is extremely small such that wrench 55 is unable to access and torque the locking nut 36. It is important to remember that the face seal fluid connectors on the junction adapters 30 are compression-type connectors that require a substantial amount of torque to be adequately secured. Therefore, anything that inhibits the ability to torque the locking nut 36 and secure the fluid line is extremely undesirable.

The problem as just described has been already experienced with face seal junction adapters in a few of the Series of MULTI-CLAMP ® systems described above, even when the adjacent junction adapters connect different sized fluid lines. For example, in the HC-10 series MULTI-CLAMP ® system where junction adapters connect fluid fittings ranging from ¼" to ⅜", inadequate clearance conditions can exist between the adjacent junction adapters of ¼" and ⅜" fluid lines. Similar conditions are also found with certain sizes of junction adapters in the HC-16 and HC-32 series MULTI-CLAMP ® systems.

An important and necessary feature for any new plural line clamping system junction adapter is that it must be capable of being retrofit into the existing plural line clamping systems. As mentioned above, there are currently several tens of thousands of MULTI-CLAMP ® systems in service in the United States and other countries, and each includes several junction adapters. Also, the manufacturer of MULTI-CLAMP ® systems, its distributors and a number of their larger customers each maintain a substantial inventory of MULTI-CLAMP ® systems and components. In addition, conventional plural line clamping assemblies come in several different standard sizes of channels, with each different size channel requiring a different size central support portion. To change the dimensions of the conventional plural line clamping systems would require tooling changes for each such size channel amounting to several millions of dollars for each different size. Thus, any new junction adapter must fit into the existing plural line clamping assemblies or it will not be successful in the marketplace, because it is not realistic to expect the industry to replace completed design or existing plural line clamping systems merely to accommodate a new and superior junction adapter.

In light of the foregoing discussion, it is a principal object of the present invention to provide a high quality junction adapter for use within a conventional plural line clamping system of the type including face seal fluid connectors that will provide adequate clearance for a wrench or other tool to easily access the locking nuts of the fluid fittings of junction adapters positioned in adjacent locations in the plural line clamping system.

SUMMARY OF THE INVENTION

To solve the above-noted problems relating to the tightening of the face seal fluid connectors and to achieve the aforementioned object, an improved junction adapter having face seal fluid connectors is provided for use in a conventional plural line clamping system as described above. In particular, the plural line clamping system is of the type having a plurality of channels each of generally U-shaped cross-section and each provided with two leg sections and a connecting section in between the leg sections. The leg sections of the channels have semi-cylindrical collar portions that are formed at their outermost extent. Also, stacking nuts are included, and are disposed between the channels to separate them in a position such that the U-shapes of the channels face each other and pairs of semi-cylindrical collar portions oppose each other and encompass a diameter. Bolts pass through the channel members to hold the stacking nuts in place.

Two embodiments of the present invention are described. The first embodiment may be called a symmetrical junction adapter with extra-long axial extension portions. In this first embodiment, the junction adapter features two extra-long axial extension portions, each of which are located between a respective cylindrical collar support portion and fluid connector portion. These two axial portions extend symmetrically in opposite axial directions from a central support portion. The length of the axial support portions is substantially beyond any of those ever found in any other type of junction adapter made, including those found on conventional face seal junction adapters.

The purpose of this extra-long axial extension is place the connector portion axially outwardly from the position it would normally occupy on a conventional junction adapter. In this manner, the hexagonally-shaped locking nut (or other complementary connector member) to be tightened upon the connector portion of the junction adapter of the present invention is clear of adjacent obstructions. Thus, it can be grasped firmly with a standard wrench or like tool that requires a fair amount of clearance to be used effectively. The obstructions typically are the fluid connectors of the adjacent junction adapters. This problem of wrench clearance is most acute with conventional face seal junction adapters, and substantially increases the difficulty of and time required to install and tighten fluid connectors.

In the preferred arrangement for using the first embodiment of the present invention, this new junction adapter with its symmetrical axial extension portions has face seal connection portions and is installed in a plural line clamping system in an alternating manner with conventional face seal junction adapters. This arrangement is illustrated in the drawings, and will be further explained. This enables those in the art to obtain the benefits of the present invention without obsoleting or having to discard or replace their on-hand inventory of existing junction adapters of the face seal or any other type.

The second embodiment of the present invention provides an alternate solution to the problems presented above. This second embodiment of the present invention may be called an asymmetrical junction adapter. It has two axial extension portions which extend for substantially different lengths in opposite axial directions from the central support portion. In this embodiment, only one of the axial extension portions is extra-long so as to extend its fluid connector portion substantially beyond the location of a fluid connector portion on a conventional junction adapter would occupy. The other axial extension portion of the asymmetrical junction adapter is much shorter, and may be of any conventional or suitable length. Because the two axial support portions of this embodiment are of two distinctly different lengths, the central support portion is noticeably located asymmetrically along the entire length of the junction adapter.

In the preferred arrangement for the second embodiment of the present invention, at least two of these junction adapters are installed in a plural line clamping system in a consecutive but successively alternated manner. In this arrangement, the extra-long axial extension portions of adjacent junction adapters are thus on opposite sides of the channel members in successive positions. The connector portions of adjacent junction adapters thus extend axially outwardly to different lengths at each adjacent position in the clamping system. This provides significant clearance for wrenches or similar tools to access and tighten the face seal connector members on both sides of the junction adapters.

An advantage of the asymmetrical junction adapter is that only one type of face seal junction adapter needs to be kept in inventory by distributors, machinery installers and pipe fitters to handle new installations in the field. The first and second embodiments of the present invention are preferably used with face seal fluid connections, which have the greatest difficulty with wrench clearances.

It should be understood that the junction adapters of the present invention are preferably used to provide needed wrench clearances for face seal fluid connections for can also be utilized in plural line clamping systems that mount a variety of other devices such as regular junction adapters having flared fluid connectors, split bushings, retaining blocks and the like.

BRIEF DESCRIPTION OF THE DRAWINGS

These and other features, objects and advantages of the present invention can be better understood by reading the following detailed description in conjunction with the drawings, in which:

FIG. 1 is a top view of a plural line clamping system having conventional face seal junction adapters and a first embodiment of the junction adapter of the present invention;

FIG. 2 is a top view of a plural line clamping system having a second embodiment of the junction adapter of the present invention;

FIG. 3 is a front view of the plural line clamping system of FIG. 1 shown in partial cross-section;

FIG. 4 is a side view along line 4—4 of the plural line clamping system of FIG. 2 showing the second embodiment of the junction adapter of the present invention in partial cross-section and being connected to a fluid line; and FIG. 5 is a side view along line 5—5 of the plural line clamping system of FIG. 2 showing an alternate configuration for the second embodiment of the junction adapter of the present invention in partial cross-section.

DESCRIPTION OF THE PREFERRED EMBODIMENTS

It should be understood from the outset that while the following discussion illustrates particular embodiments of the present invention, these embodiments merely represent the best modes known at the present time for of practicing the invention and other modifications may be made to the particular embodiments without departing from the spirit and scope of the invention.

With reference now to the drawings, a first embodiment of the junction adapter 10 of the present invention can be best understood upon consideration of FIGS. 1 and 3. Improved junction adapter 10 is similar in construction to conventional face seal junction adapters 30. However new junction adapter 10 is characterized by axial extension portions 11 which are located between cylindrical collar support portions 12 and face seal fluid connector means 20 (best illustrated in FIG. 4) and extend axially and symmetrically in both directions from a central support portion 14. New junction adapter 10 is then positioned within the plural line clamping system 40 in a successively alternating manner together with conventional face seal junction adapters 30. In other words, the junction adapter 10 and the junction adapter 30 are placed in adjacent locations in the plural line clamping system, as shown in positions B, C, D and E of FIGS. 1 and 3. Consequently, wrench 50 is able to easily access the locking nuts 16, 36 of both junction adapters 10, 30.

The actual length of extension portions 11 that is required in the junction adapter 10 varies depending upon the size of the plural line clamping system in which the junction adapter 10 is utilized. As mentioned previously, plural line clamping systems have been sold under the trademark MULTI-CLAMP® in several standard sizes, which correspond to the size and spacing of fluid lines that are secured by the clamping system. Consequently, as the size of the clamping system increases, longer extension portions 11 are required to provide the necessary clearance for the locking nuts of the junction adapters to be accessed by a wrench and torqued. For example, the improved junction adapter 10 of the present invention for a HC-10 series MULTI-CLAMP® system would require an axial extension portion 11 of approximately one inch to be used with conventional HC-10 series junction adapters, whereas an improved junction adapter 10 for a HC-16 series MULTI-CLAMP® system would require an axial extension portion 11 of approximately a one and one quarter inches (1.25") to be used with a conventional HC-16 series junction adapter 30.

A second embodiment of the junction adapter 10' of the present invention can be understood upon review of FIG. 2. Here improved junction adapter 10' incorporates the feature whereby the lengths of axial extension portions 11'A, 11'B are not equal and one axial extension portion 11'A is substantially longer than the other 11'B. Consequently, the central support portion 14' is located asymmetrically along the entire axial length of the junction adapter 10'. In this configuration, improved junction adapters 10' are consecutively positioned within the plural line clamping system 40 in an alternating or "flip-flopping" manner, without necessitating the inclusion of conventional face seal junction adapters 30. That is, the junction adapters 10' are placed in the plural line clamping system 40 such that the axial extension portions 11'A, 11'B of consecutive junction adapters extend at different axial lengths, as shown at positions A, B, C and D of FIG. 2.

Improved junction adapters 10, 10' of both the first and second embodiments fulfill a respective need in the art. For example, there are tens of thousands of MULTI-CLAMP® systems already in use in the United States and other countries, many havig conventional face seal junction adapters 30 as shown in FIG. 1. In these cases, the improved junction adapter 10 of the first embodiment is appropriate, since replacement of the junction adapters 30 for fluid lines currently being secured by the plural line clamping system 40 could be minimized or eliminated, and at the same time, the introduction of new fluid lines to the plural line clamping system 40 could be easily accommodated. In contrast, the improved junction adapter 10' of the second embodiment may be incorporated in new plural line clamping system installations, and thereby eliminate the need to purchase, stock and utilize two different types of junction adapters 10, 30. Of course it should be understood that the junction adapters of the present invention can also be utilized in plural line clamping systems that mount a variety of other devices such as regular junction adapters having flare fluid connectors, split bushing adapters, retaining blocks and the like.

The improved junction adapters 10, 10' of the present invention are generally similar in construction to conventional face seal junction adapters 30. With reference now to FIG. 4, the improved junction adapter 10' is shown to be positioned within the plural line clamping system 40 between stacking nuts 46 which separate channels 42 and are secured by bolts 48. Junction adapter 10' includes a central support portion 14' and cylindrical collar support portions 12' located on either side of the central support portion 14'. Fluid passage 18' is formed in and extends through the entire axial length of junction adapter 10'. Face seal fluid connector means 20' are provided at the ends of the axial extension portions 11'A, 11'B. In particular, axial extension portions 11'A, 11'B have external threads 22' for locking nuts 16' and grooves 24' in surfaces 26' for O-rings 28'. Locking nut 16' has lip 29' which engages the end of fluid line 60. As locking nut 16' is torqued onto threads 22' of axial extension portions 11'A, 11'B, fluid line 60 is compressed against O-ring 28' and a sealed connection is achieved.

As the alternate configurations of FIGS. 4 and 5 indicate, the central support portion 14' of improved junction adapter 10' can be formed to be either rectangular or hexagonal in shape, as described in the above mentioned references. Also, central support portion 14' can have a thickness T or T' that is either less than (T) or substantially equal to (T') the width W between the channels 42 of the plural line clamping system 40, as contrastingly shown in FIGS. 4 and 5. In addition, axial extension portions 11'A, 11'B can be of a different (either larger or smaller) diameter than cylindrical collar support portions 12' as shown in FIG. 4, or the axial extension portions 11'A, 11'B and cylindrical collar support portions 12' can be of uniform diameter as shown in FIG. 5. Further, retaining shoulder portions 70 which correspond to radii formed in channels 42 at semi-cylindrical collar portions 44, can be included between the central support portion 14' and the cylindrical collar support portions 12'. These features are described in greater detail in the earlier referenced U.S. patent application Ser. No. 07/733,344 filed on Jul. 22, 1991 and assigned to the assignee of the present invention. Further, although these features are illustrated and described in connection with the second embodiment of the present invention, they are equally applicable to and may be incorporated into the first embodiment.

In addition, the junction adapters 10, 10' of the present invention can be of a single or multi-piece design. If of a single piece design, improved junction adapters 10, 10' can be manufactured from commonly available standard sizes of hexagonal bar stock using standard automatic screw machines. Any suitable material such as 1008 or 1010 mild steel can be used. As is well-known in the art, hexagonal bar stock is readily available in a variety of SAE standard sizes that will correspond to the dimensions needed to have the central support portion 14, 14' of the junction adapter 10, 10' fit into the various sizes of channels 42 of the plural line clamping system 40. In other words, it is not necessary to machine the exterior flat surfaces of the central support portion 14, 14'. In this configuration, the junction adapter 10, 10' is formed by first turning the hexagonal bar stock to remove material so as to leave the cylindrical collar support portions 12, 12', axial extension portions 11, 11'A, 11'B and the retaining shoulder portions 70 (if desired). Threads 22' are then formed for the face seal fluid connector means 20' and the fluid passage 18' is bored or drilled out.

Further details as to the techniques used to machine the junction adapter 10 or 10' need not be given here, since they would be readily apparent to any one of ordinary skill in automatic screw machine art. Once the junction adapter 10, 10' has been completely formed, it is then preferably cadmium-plated or zinc-plated for corrosion protection, using well-known plating techniques. By these methods, a one-piece junction adapter 10 or 10' of the present invention is economically obtained.

Although two working embodiments of the present invention has been disclosed, a worker in the art would realize that a number of modifications may be made to them, which would still be within the scope of the present invention. For example, although the preferred embodiments are shown with face seal connectors, those in the art will appreciate that virtually any other type of a known or later-developed fluid line connector may be used instead in the junction adapters of the present invention. Various other advantages and modifications will become apparent to one skilled in the art after having the benefit of studying the teachings of the specification, the drawings, and the following claims. The intended scope of the present invention can best be understood by consideration of the appended claims, including all fair equivalents thereof.

What is claimed is:

1. A junction adapter for a plural line clamping system of the type having (1) a plurality of channels each of generally U-shaped cross-section and each provided with two leg sections and a connecting section therebetween, the leg sections provided with semi-cylindrical collar portions formed in the leg sections at the outermost extent thereof and (2) stacking nut means, disposed between and for separating the channels in a position such that the U-shapes of the channels face each other and pairs of semi-cylindrical collar portions oppose each other and encompass a diameter, the junction adapter comprising:

a central support portion located asymmetrically along the axial length of the junction adapter;

two cylindrical collar support portions each formed radially smaller than the central support portion, the cylindrical collar support portions being sized to span the diameter encompassed by one pair of the opposed semi-cylindrical collar portions and adapted to be received therebetween;

two fluid connection portions provided with connector means to sealingly receive a fluid line connection; and two axial extension portions each located between a cylindrical collar support portion and a fluid connection portion and each projecting for a substantially different axial length from the central support portion such that each fluid connection portion is easily accessible by a standard wrench or like tool when the junction adapter is installed in the plural line clamping system, adjacent to two identical junction adapters alternately arranged therein, and wherein the central support portion, the axial extension portions, the cylindrical collar support portions, and the fluid connection portions have a common fluid passage extending therethrough.

2. A junction adapter as recited in claim 1, wherein each connector means is a face seal connection formed on and constituting an integral part of its respective fluid connection portion.

3. A junction adapter as recited in claim 1, wherein the central support portion is hexagonal in shape.

4. A junction adapter as recited in claim 1, wherein the junction adapter is formed from a single piece of material.

5. A plural line clamping system comprising:

first and second channel members, each the channel member being of generally U-shaped cross-section and having two leg sections and a connecting section therebetween, each leg section being provided with a plurality of semi-cylindrical collar portions formed at the outermost extent thereof, the first and second channel members being adapted to be aligned and secured to each other in a position whereby the U-shapes of the channel members face each other and pairs of semi-cylindrical collar portions oppose each other and encompass a diameter;

a plurality of elongated stacking nut members of a common first length being disposed generally within the U-shaped channels of the first and second channel members and extending between the channel members, the stacking nuts being located on each side of the semi-cylindrical collar portions of the channel members, and each stacking nut being spaced from the next adjacent stacking nut by a second length;

a plurality of junction adapters each being formed with a central support portion of hexagonal cross-section that is located asymmetrically along the axial length of the junction adapter and sized to be received within the U-shaped cross-sections of the first and second channel members, each junction adapter being received between the leg sections of the channel members and the adjacent stacking nut members and being dimensioned so that the distance between two opposed points on the central support portion is substantially equal to the first length and the distance between any two opposed faces of the central support portion is equal to the second length, each junction adapter having cylindrical collar support portions that are radially smaller than the central support portion and sized to span the diameter encompassed by the opposed semi-cylindrical collar portions, each junction adapter including fluid connection portions, and each junction adapter having a fluid passage extending axially through the entire length of the junction adapter; and a plurality of bolt members extending through the first and second channel members and into engagement with the stacking nuts to cause the channel members to bear against and capture each junction adapter between the channel members and the adjacent stacking nut members, and each junction adapter is including two axial extension portions each located between a cylindrical collar support portion and a fluid connection portion and each projecting for a substantially different axial length from the central support portion, and wherein the junction adapters are successively and consecutively positioned within the clamping system in an alternating manner such that the axial extension portions of adjacent junction adapters extend at different axial lengths and the fluid connection portions of each junction adapter are readily accessible by a standard wrench or like tool.

6. A junction adapter for a plural line clamping system of the type having (1) a plurality of channels each of generally U-shaped cross-section and each provided with two leg sections and a connecting section therebetween, the leg sections provided with semi-cylindrical collar portions formed in the leg sections at the outermost extent thereof and (2) stacking nut means, disposed between and for separating the channels in a position such that the U-shapes of the channels face each other and pairs of semi-cylindrical collar portions oppose each other and encompass a diameter, the junction adapter comprising:

a central support portion located symmetrically along the axial length of the junction adapter;

two cylindrical collar support portions each formed radially smaller than the central support portion, the cylindrical collar support portions being sized to span the diameter encompassed by one pair of the opposed semi-cylindrical collar portions and adapted to be received therebetween;

two fluid connection portions provided with connector means to sealingly receive a fluid line connection; and two axial extension portions each located between a cylindrical collar support portion and a fluid connection portion and each projecting for a substantially equal axial length from the central support portion such that each fluid connection portion is easily accessibly by a standard wrench or like tool when the junction adapter is installed in the plural line clamping system adjacent to two conventional junction adapters having the same style of fluid connection positions, and wherein the central support portion, the axial extension portions, the cylindrical collar support portions, and the fluid connection portions have a common fluid passage extending therethrough.

7. A junction adapter as recited in claim 6, wherein each the connector means is a face seal connection formed on and constituting an integral part of its respective fluid connection portion.

8. A junction adapter as recited in claim 6, wherein the central support portion is hexagonal in shape.

9. A junction adapter as recited in claim 6, wherein the junction adapter is formed from a single piece of material.

10. A plural line clamping system comprising:

first and second channel members, each channel member being of generally U-shaped cross-section and having two leg sections and a connecting section therebetween, each leg section being provided with a plurality of semi-cylindrical collar portions formed at the outermost extent thereof, the first and second channel members being adapted to be aligned and secured to each other in a position whereby the U-shapes of the channel members face each other and pairs of semi-cylindrical collar portions oppose each other and encompass a diameter;

a plurality of elongated stacking nut members of a common first length being disposed generally within the U-shaped channels of the first and second channel members and extending between the channel members, the stacking nuts being located on each side of the semi-cylindrical collar portions of the channel members, and each stacking nut being spaced from the next adjacent stacking nut by a second length;

first and second junction adapters, each junction adapter being formed with a central support portion of hexagonal cross-section that is sized to be received within the U-shaped cross-sections of the first and second channel members, the junction adapters being received between the leg sections of the channel members and the adjacent stacking nut members and being dimensioned so that the distance between two opposed points on the central support portions are substantially equal to the first length and the distance between any two opposed faces of the central support portions are equal to the second length, the junction adapters having cylindrical collar support portions that are radially smaller than the central support portion and sized to span the diameter encompassed by the opposed semi-cylindrical collar portions, the junction adapters including fluid connection portions, and having a fluid passage extending axially through the entire length thereof; and a plurality of bolt members extending through the first and second channel members and into engagement with the stacking nut members to cause the channel members to bear against and capture each of the junction adapters between the channel members and adjacent stacking nut members, and wherein the first junction adapter including two extra-long axial extension portions each located between a respective cylindrical collar support portion and fluid connection portion, and wherein the first and second junction adapters are positioned within the clamping system in a successively alternating manner such that the fluid connection portions of each junction adapter are readily accessible by a standard wrench or like tool.

11. An improved junction adapter for use in a plural line clamping system, the junction adapter being of the type having a central support portion, two cylindrical collar support portions each being formed radially smaller than the central support portion and being sized to be received within the plural line clamping system, two fluid connection portions each located at the end of one of the cylindrical collar support portions opposite the central support portion and provided with connector means to sealingly receive a fluid line connection, and wherein the central support portion, the cylindrical collar support portions, and the fluid connection portions having a common fluid passage extending therethrough, the improvement comprising:

two axial extension portions each being located between a cylindrical collar support portion and a fluid connection portion and extending substantially different axial lengths from the central support portion, such that the central support portion is located asymmetrically along the entire axial length of the junction adapter, and such that the connection means are easily accessible by a standard wrench or like tool when such identical improved junction adapters are consecutively positioned within a plural line clamping system in an alternating manner such that the connection portions of adjacent junction adapters are located at different axial lengths.

12. An improved junction adapter for use in a plural line clamping system, the junction adapter being of the type having a central support portion, two cylindrical collar support portions each being formed radially smaller than the central support portion and being sized to be received within the plural line clamping system, two fluid connection portions each located at the end of one of the cylindrical collar support portions opposite the central support portion and provided with connector means to sealingly receive a fluid line connection, and wherein the central support portion, the cylindrical collar support portions, and the fluid connection portions having a common fluid passage extending therethrough, the improvement comprising:

two axial extension portions each being located between a cylindrical collar support portion and a fluid connection portion and extending substantially equal axial lengths from the central support portion such that the central support portion is located symmetrically along the entire axial length of the junction adapter, and such that the connection means are easily accessible by a standard wrench or like tool when the junction adapter is installed in the plural line clamping system adjacent to two conventional junction adapters having the same style of fluid connection portions.

* * * * *

UNITED STATES PATENT AND TRADEMARK OFFICE
CERTIFICATE OF CORRECTION

PATENT NO. : 5,280,964
DATED : January 25, 1994
INVENTOR(S) : Walker et al.

It is certified that error appears in the above-indentified patent and that said Letters Patent is hereby corrected as shown below:

Abstract, line 17, after "systems" insert --.--.

Column 4, line 57, after "is" insert --to--.

Column 6, line 26, delete --of--.

Column 7, line 25, replace "havig" with --having--.

Column 8, line 56, replace "has" with --have--.

In the Claims

Column 9, line 51, Claim 5, after "each" insert --of--.

Column 11, line 4, Claim 6, replace "accessibly" with --accessible--.

Column 11, line 14, Claim 7, after "each" insert --of--.

Signed and Sealed this

Twenty-seventh Day of September, 1994

Attest:

BRUCE LEHMAN

Attesting Officer     Commissioner of Patents and Trademarks